(12) United States Patent
Matsuta (10) Patent No.: US 12,415,338 B2
(45) Date of Patent: Sep. 16, 2025

(54) COMPOSITE MATERIAL

(71) Applicant: A.L.M.T. Corp., Tokyo (JP)

(72) Inventor: Naoya Matsuta, Toyama (JP)

(73) Assignee: A.L.M.T. Corp., Tokyo (JP)

( * ) Notice: Subject to any disclaimer, the term of this patent is extended or adjusted under 35 U.S.C. 154(b) by 0 days.

(21) Appl. No.: 17/800,422

(22) PCT Filed: Oct. 12, 2021

(86) PCT No.: PCT/JP2021/037683
§ 371 (c)(1),
(2) Date: Aug. 17, 2022

(87) PCT Pub. No.: WO2022/091766
PCT Pub. Date: May 5, 2022

(65) Prior Publication Data
US 2023/0086909 A1     Mar. 23, 2023

(30) Foreign Application Priority Data

Oct. 26, 2020   (JP) ................... 2020-178511

(51) Int. Cl.
*B32B 15/01*     (2006.01)
*C22C 9/06*      (2006.01)
(Continued)

(52) U.S. Cl.
CPC .............. *B32B 15/013* (2013.01); *C22C 9/06* (2013.01); *C22C 19/03* (2013.01);
(Continued)

(58) Field of Classification Search
None
See application file for complete search history.

(56) References Cited

U.S. PATENT DOCUMENTS 3,436,806 A * 4/1969 Supan ................. B23K 35/002
428/653
8,043,692 B2   10/2011 Zhuk et al.
(Continued)

FOREIGN PATENT DOCUMENTS

| CN | 1507975 A | 6/2004 |
|---|---|---|
| CN | 102000895 A | 4/2011 |

(Continued)

OTHER PUBLICATIONS

English machine translation of CN109454321, EPO, accessed Aug. 4, 2023.*

(Continued)

*Primary Examiner* — Xiaobei Wang
(74) *Attorney, Agent, or Firm* — McCarter & English, LLP; Michael A. Sartori (57) ABSTRACT

A composite material includes: an iron-based alloy layer; an intermediate layer provided on the iron-based alloy layer; and a tungsten-containing layer provided on the intermediate layer, wherein the intermediate layer is composed of pure nickel or is an alloy that contains at least one selected from a group consisting of copper, cobalt, and iron at more than 0 mass % and less than or equal to 71 mass % in total, and that contains nickel at more than or equal to 29 mass % and less than 100 mass %.

12 Claims, 3 Drawing Sheets

(51) Int. Cl.
*C22C 19/03* (2006.01)
*C22C 27/04* (2006.01)

(52) U.S. Cl.
CPC ........ *B32B 2307/732* (2013.01); *C22C 27/04* (2013.01); *Y10T 428/1284* (2015.01)

(56) References Cited

U.S. PATENT DOCUMENTS

| 2009/0117372 A1* | 5/2009 | Zhuk ....................... C23C 16/30 |
| | | 204/192.15 |
| 2021/0346976 A1* | 11/2021 | Scotchmer ........... B23K 35/004 |

FOREIGN PATENT DOCUMENTS

| CN | 102658443 A | | 9/2012 |
| CN | 104858570 A | | 8/2015 |
| CN | 105216394 A | * | 1/2016 |
| CN | 105346161 A | * | 2/2016 |
| CN | 105499816 A | | 4/2016 |
| CN | 105965176 A | | 9/2016 |
| CN | 107225249 A | | 10/2017 |
| CN | 109396631 A | | 3/2019 |
| CN | 109454321 A | | 3/2019 |
| CN | 109604802 A | | 4/2019 |
| CN | 110303236 A | | 10/2019 |
| JP | 2000-246549 A | | 9/2000 |
| JP | 2022-174303 A | | 11/2022 |

OTHER PUBLICATIONS

English translation of CN105965176, EPO, accessed Jan. 11, 2024.*
Future Alloys, "Tungsten Copper—Datasheet", https://futurealloys.co.uk/copper-tungsten-datasheet, Dec. 13, 2017, accessed via web.archive.org (Year: 2017).*
Lu et al., "The thermal properties of high purity and fully dense tungsten produced by chemical vapor deposition", Nov. 27, 2014, J. of Nuclear Materials, vol. 457, pp. 317-323. (Year: 2014).*
Office Action issued in JP Application No. 2020-178511 dated Jan. 10, 2023.
Communication in Chinese Application No. 202180023022.8 dated Jul. 28, 2023.
Extended European Search Report issued in European Application No. 21885885.0 dated Nov. 26, 2024.

* cited by examiner

COMPOSITE MATERIAL

TECHNICAL FIELD

The present disclosure relates to a composite material. The present application claims a priority based on Japanese Patent Application No. 2020-178511 filed on Oct. 26, 2020, the entire content of which is incorporated herein by reference.

BACKGROUND ART

Conventionally, a composite material is disclosed, for example, in Japanese Patent Laying-Open No. 2000-246549 (PTL 1).

CITATION LIST

Patent Literature

PTL 1: Japanese Patent Laying-Open No. 2000-246549

SUMMARY OF INVENTION

A composite material of the present disclosure includes: an iron-based alloy layer; an intermediate layer provided on the iron-based alloy layer; and a tungsten-containing layer provided on the intermediate layer, wherein the intermediate layer is composed of pure nickel or an alloy that contains at least one selected from a group consisting of copper, cobalt, and iron at more than 0 mass % and less than or equal to 71 mass % in total, and that contains nickel at more than or equal to 29 mass % and less than 100 mass %.

DESCRIPTION OF EMBODIMENTS

Problem to be Solved by the Present Disclosure

In the conventional composite material, an intermediate layer has low heat resistance to facilitate fracture of a joining portion, disadvantageously.

Description of Embodiments of the Present Disclosure

First, embodiments of the present disclosure are listed and described.

A composite material of the present disclosure includes: an iron-based alloy layer; an intermediate layer provided on the iron-based alloy layer; and a tungsten-containing layer provided on the intermediate layer, wherein the intermediate layer is composed of pure nickel or an alloy that contains at least one selected from a group consisting of copper, cobalt, and iron at more than 0 mass % and less than or equal to 71 mass % in total, and that contains nickel at more than or equal to 29 mass % and less than 100 mass %. Hereinafter, the layered structure of the iron-based alloy layer, the intermediate layer, and the tungsten-containing layer will be referred to as "tungsten/iron-based alloy clad material".

The thickness of the tungsten-containing layer of the tungsten/iron-based alloy clad material can be appropriately selected in accordance with a purpose of use.

Each of the grain sizes of tungsten in the tungsten-containing layer is preferably more than or equal to 20 μm. With a fine structure of less than 20 μm, the tungsten-containing layer is brittle and is readily fractured, with the result that a desired structure might not be obtained after a compression bonding step. In a method of measuring the grain size of tungsten, first, a crystal grain boundary image is captured using electron beam backscattering diffraction. Since a crystal grain boundary appears in a black color and a crystal grain appears in a white color, the respective lengths of the major axes of the crystal grains are counted by image analysis software (Image-Pro Plus) so as to calculate the average value thereof.

Normally, the thickness of the tungsten-containing layer of the tungsten/iron-based alloy clad material is preferably less than or equal to 5 mm. When the thickness of the tungsten-containing layer is less than or equal to 5 mm, even though there is a difference in thermal expansion coefficient between the iron-based alloy layer and the tungsten-containing layer, the tungsten-containing layer is deformed to securely suppress detachment of the tungsten-containing layer from the iron-based alloy layer. However, when the thickness of the tungsten-containing layer is in the range of more than 1 mm and less than or equal to 5 mm, it may be difficult to join the tungsten-containing layer to the iron-based metal due to an influence of thermal stress resulting from the difference in thermal expansion coefficient, so that a preliminary joining step using HIP (Hot Isostatic Press) and hot press is required.

The thickness of the material of the tungsten-containing layer of the tungsten/iron-based alloy clad material is more preferably less than or equal to 1 mm. In this range, the influence of thermal stress resulting from the difference in thermal expansion coefficient is hardly observed when joining the tungsten-containing layer to the iron-based metal, with the result that the clad material can be more readily produced.

A method of measuring the relative density of the tungsten-containing layer is as follows.

The intermediate layer just below the tungsten-containing layer, and the iron-based alloy are completely removed by mechanical polishing and electrolytic polishing, thereby taking out only the tungsten-containing layer. Based on JIS Z 8807 (2012), the density of the tungsten-containing layer taken out is measured in accordance with a hydrostatic weighing method, and a value obtained by dividing the measured density by the theoretical density of the tungsten-containing layer is defined as the relative density of the tungsten-containing layer.

The relative density of the tungsten-containing layer of the tungsten/iron-based alloy clad material is preferably more than or equal to 97%. When the relative density is less than this, voids each having a diameter of more than or equal to 10 μm might be generated in the tungsten-containing layer, with the result that the voids might be facilitated to remain at a joining interface. It should be noted that the expression "might" is intended to indicate a slight possibility of occurrence, rather than a high probability of occurrence.

The thickness of the tungsten-containing layer of the tungsten/iron-based alloy clad material is preferably more than or equal to 0.05 mm.

When the thickness is less than 0.05 mm, the tungsten-containing layer might be fractured in the joining step. The tungsten-containing layer after the joining might have fractured portions and non-fractured portions, with the result that a desired structure might not be obtained.

The thickness of the tungsten-containing layer of the tungsten/iron-based alloy clad material is more preferably more than or equal to 0.08 mm. When the thickness is in the range of more than or equal to 0.08 mm, the tungsten-containing layer is less likely to be folded or wrinkled in handling the tungsten-containing layer at a preparation stage before the joining, with the result that the clad material can be produced more readily. The thickness of the tungsten-containing layer is preferably more than or equal to 0.05 mm and less than or equal to 5 mm. The thickness of the tungsten-containing layer is more preferably more than or equal to 0.08 mm and less than or equal to 1 mm.

A variation in thickness of the tungsten-containing layer is preferably less than or equal to 10% of the thickness of the tungsten-containing layer.

The variation in thickness in the present disclosure refers to a standard deviation when the thickness of the tungsten-containing layer is measured at five positions. In order to find the standard deviation, first, the average value of the thicknesses at the five positions is calculated. A deviation (value obtained by subtracting the average value from each of the thicknesses) is found. The deviation is squared. The total of the squared deviations at the five positions is calculated. The total is divided by the total number of pieces of data (5) to obtain a variance. The positive square root of the variance is found and is used as the standard deviation.

The method of measuring the thickness of the tungsten-containing layer is as follows.

A cross section of the clad material is observed using an electron beam microanalyzer so as to perform line scan of WDX analysis onto the tungsten-containing layer and the iron-based alloy layer in the thickness direction. A range in which the total amount of the constituent elements of the tungsten-containing layer is more than or equal to 50 mass % is defined as the thickness of the tungsten-containing layer.

The thickness of the iron-based alloy, i.e., the base material side of the tungsten/iron-based alloy clad material can be appropriately determined in accordance with a purpose of use.

The thickness of the iron-based alloy is normally more than or equal to 1 mm and less than 30 mm. The composition of the iron-based alloy, i.e., the base material side of the tungsten/iron-based alloy clad material can be appropriately determined in accordance with a purpose of use. The iron-based alloy is an alloy that contains iron as a primary component (component having the highest content ratio) and belongs to a group of pure iron, plain steel, special steel, cast iron, and cast steel.

The composition of the tungsten-containing layer of the tungsten/iron-based alloy clad material can be appropriately determined in accordance with a purpose of use. However, the tungsten content ratio of the tungsten-containing layer is more than or equal to 70 mass %, and is preferably more than or equal to 90 mass %.

The thickness of the intermediate layer of the tungsten/iron-based alloy clad material is preferably less than or equal to 50 μm. When the thickness is more than 50 μm, fracture might occur at the intermediate layer. A method of measuring the thickness of the intermediate layer is as follows.

A cross section of the clad material is observed using an electron beam microanalyzer so as to perform line scan of WDX analysis onto the tungsten-containing layer and the iron-based alloy layer in the thickness direction. A range in which the total of the constituent elements of the intermediate layer is more than or equal to 50 mass % is defined as the thickness of the intermediate layer.

The composition of the intermediate layer of the tungsten/iron-based alloy clad material is composed of pure nickel or a nickel-containing alloy. For component(s) other than nickel in the nickel-containing alloy, one or more of iron, cobalt, and copper can be selected in accordance with a purpose of use. With this composition, the intermediate layer has high heat resistance with a melting start temperature comparable to or more than or equal to a melting start temperature (800° C. to 1083° C.) of each of general copper alloy and copper wax and a melting start temperature (875° C. to 1080° C.) of nickel wax. Further, the thermal expansion coefficient of the intermediate layer can be controlled, with the result that an optimal clad material can be designed in accordance with a purpose of use. Examples of a method of introducing the intermediate layer include insertion of a foil having the composition of the intermediate layer, plating, vapor deposition, sputtering, and the like.

The intermediate layer preferably has one of the following configurations. The intermediate layer is composed of pure nickel and an inevitable impurity. The intermediate layer is composed of a nickel alloy and an inevitable impurity.

In the composition of the intermediate layer of the tungsten/iron-based alloy clad material, the nickel content ratio is at least more than or equal to 29 mass %.

In this composition range, the heat resistance of the clad material is increased, thereby attaining a melting start temperature of more than or equal to 1200° C., which is sufficiently higher than that of the general copper alloy, copper brazing, or nickel brazing. Moreover, in this composition range, oxidation resistance can be increased to suppress oxidation of the intermediate layer in the step of preparing a joining-target material, with the result that the clad material can be more readily produced.

In the composition of the intermediate layer of the tungsten/iron-based alloy clad material, a nickel-copper alloy having a nickel content ratio of more than or equal to 40 mass % and less than 67 mass % is most preferable. The remainder is copper and an inevitable impurity.

With this composition, oxidation resistance is higher, with the result that the clad material can be formed most readily.

Further, since the intermediate layer becomes nonmagnetic, an influence over the magnetic property of the entire clad material is small. This is most preferable because the clad material can be applied to a shielding structural material or the like in a device, such as a medical device, in which a ferromagnetic substance should be avoided, thus increasing an industrially applicable range.

When the nickel alloy is used as the intermediate layer that is less likely to transfer heat, it is preferable that the ratio of nickel is more than or equal to 50 mass % and the ratio of copper is less than 50 mass %. In this case, heat conductivity can be decreased as compared with a nickel alloy having more than or equal to 50 mass % of copper, thereby suppressing heat transfer from the tungsten-containing layer to the iron-based alloy layer.

Preferably, the number of voids each having a diameter of more than or equal to 10 μm is less than or equal to 10 per $cm^2$ between the iron-based alloy layer and the tungsten-containing layer.

In order to decrease the number of voids, a tungsten plate material is preferably brought into contact with the intermediate layer. Since no voids are present or a small number of voids, if any, are present in the tungsten plate material, generation of voids can be prevented in the production step by bringing the tungsten plate material into contact with the intermediate layer.

Figure 1:
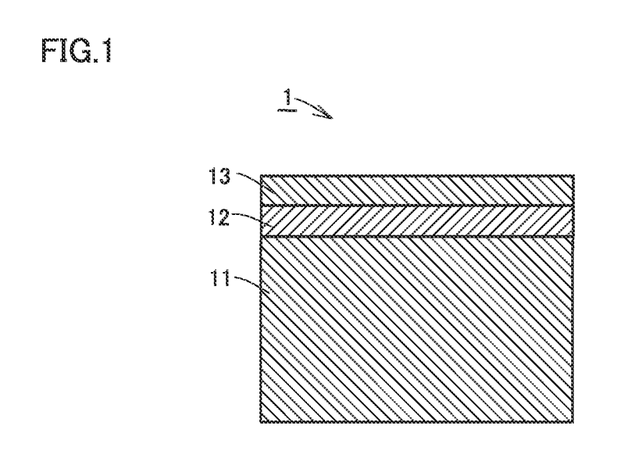
FIG. 1 is a cross sectional view of a composite material 1 according to an embodiment.

FIG. 1 is a cross sectional view of a composite material 1 according to an embodiment. As shown in FIG. 1, composite material 1 has: an iron-based alloy layer 11; an intermediate layer 12 layered on iron-based alloy layer 11; and a tungsten-containing layer 13 layered on intermediate layer 12. In the present embodiment, the composite material has such a three-layer structure; however, a larger number of layers may be layered. For example, iron-based alloy layer 11, intermediate layer 12, tungsten-containing layer 13, intermediate layer 12 and iron-based alloy layer 11 may be layered in this order from below. Further, tungsten-containing layer 13, intermediate layer 12, iron-based alloy layer 11, intermediate layer 12 and tungsten-containing layer 13 may be layered in this order from below.

Details of Embodiments of the Present Disclosure

Hereinafter, the present disclosure will be described based on examples.

(1) Preparation of Sample of Example of the Present Disclosure and Evaluation on Thickness of Intermediate Layer The following describes production of a tungsten/iron-based alloy clad material of a specimen No. 1 in Table 1.

(1-1) Step of Preparing Joining-Target Material

As a source material of the tungsten-containing layer, a rolled tungsten plate was prepared which had a relative density of more than or equal to 99.9% as measured in density by the hydrostatic weighing method and which had a thickness of 0.3 mm.

This rolled tungsten plate was cut into a size of B (width) of 100 mm×L (length) of 100 mm by a shirring apparatus. For the iron-based alloy (steel material) serving as a substrate, a SUS316L plate having a thickness of 8 mm was used and was cut into a size of B of 100 mm×L of 100 mm by band saw cutting.

A pure nickel foil having a thickness of 10 μm and a purity of more than or equal to 99 mass % was used as the intermediate layer. These source materials are shown in Table 1.

TABLE 1

| Table 1 Specimen No. | Composition of Rolled Tungsten Material | Thickness of Rolled Tungsten Material (mm) | Composition of Steel Material | Thickness of Steel Material (mm) | Composition of Intermediate Layer | Thickness of Intermediate Layer (μm) |
|---|---|---|---|---|---|---|
| 1 | Pure W | 0.3 | SUS316L | 8 | Pure Ni | 10 |
| 2 | Pure W | 0.3 | SUS316L | 8 | Ni-56 Mass % Cu | 10 |
| 3 | Pure W | 0.3 | SS400 | 8 | Ni-40 Mass % Fe | 10 |
| 4 | Pure W | 0.3 | SUS304 | 8 | Ni-20 Mass % Co | 10 |
| 5 | Pure W | 1.2 | SUS316L | 8 | Ni-56 Mass % Cu | 10 |
| 6 | Pure W | 1 | SUS316L | 35 | Ni-56 Mass % Cu | 10 |
| 7 | Pure W | 1 | SUS316L | 2 | Pure Ni | 10 |
| 8 | Pure W | 0.06 | SUS304 | 8 | Ni-56 Mass % Cu | 10 |
| 9 | Pure W | 0.06 | SS400 | 35 | Ni-56 Mass % Cu | 10 |
| 10 | Pure W | 0.1 | SS400 | 2 | Ni-56 Mass % Cu | 20 |
| 11 | W-26 Mass % Re Alloy | 0.3 | SS400 | 4 | Pure Ni | 10 |
| 12 | W-10 Mass % (Fe, Ni) | 1 | SUS304 | 4 | Ni-56 Mass % Cu | 10 |
| 13 | W-30 Mass % Mo Alloy | 1 | SUS304 | 4 | Ni-40 Mass % Fe | 10 |
| 14 | W-3 Mass % Re Alloy | 1 | SUS304 | 4 | Ni-33 Mass % Cu-2 Mass % Fe | 10 |
| 15 | Pure W | 0.2 | SUS316L | 8 | Pure Ni | 10 |

In Table 1, the "Composition of Rolled Tungsten Material" refers to the composition before processing the rolled tungsten material to serve as the tungsten-containing layer, the "Thickness of Rolled Tungsten Material (mm)" refers to the thickness before processing the rolled tungsten material, the "Composition of Steel Material" refers to the composition before processing the steel material, the "Thickness of Steel Material (mm)" refers to the thickness before processing the steel material, the "Composition of Intermediate Layer" refers to the composition before processing the source material of the intermediate layer, and the "Thickness of Intermediate Layer (μm)" refers to the thickness before processing the source material of the intermediate layer.

Regarding specimen No. 1, the surface of each of the rolled tungsten material and the SUS316L material was polished using water-resistant paper #80 in order to obtain a newly formed surface.

The above-described three types of materials were layered in the order of the rolled tungsten plate, the pure Ni foil, the SUS316L plate, the pure Ni foil, and the rolled tungsten plate from above, and then the outer peripheries of the layered materials were welded together for the sake of fixing.

The density of the rolled tungsten plate is preferably more than or equal to 95%.

When the density of the rolled tungsten plate is less than or equal to this, the density of the tungsten-containing layer after the joining step might become less than 97%. Accordingly, voids are likely to remain at the joining interface and cracks are likely to occur in the tungsten-containing layer during the joining step, with the result that a desired structure might not be obtained.

The joining-target material formed by layering the rolled tungsten plates, the pure Ni foils, and the SUS316L plate may be fixed by not only welding but also wrapping with a tungsten or molybdenum foil, riveting of the layered materials, or bolting of the layered materials. Thereafter, the joining step is performed, thereby obtaining the tungsten/iron-based alloy clad material.

The joining-target material obtained by the layering can also be produced in the form of a three-layer structure of the tungsten-containing layer, the intermediate layer, and the iron-based metal layer. In the case of this structure, a difference in elongation ratio is large between the tungsten-containing layer located on the upper side of the clad material and the iron-based metal located on the lower side of the clad material, with the result that warpage is likely to occur when the three-layer structure is processed by ordinary, symmetrical upper and lower rolls.

Even in this case, the joining-target material can be produced using an asymmetrical rolling machine changeable in roll diameter and roll peripheral velocity between the upper and lower rolls. By employing five layers of the tungsten-containing layer, the intermediate layer, the iron-based metal, the intermediate layer, and the tungsten-containing layer, the difference in elongation ratio between the upper and lower sides becomes symmetric, with the result that the joining-target material can be produced by the ordinary, symmetrical upper and lower rolls. Thereafter, the joining step is performed, with the result that the tungsten/iron-based alloy clad material can be obtained.

For each of specimens No. 2 to No. 23 each serving as an example of the present disclosure, source materials were prepared in the same manner as in specimen No. 1. The contents thereof are shown in Tables 1 and 2.

TABLE 2

| Table 2 Specimen No. | Composition of Rolled Tungsten Material | Thickness of Rolled Tungsten Material (mm) | Composition of Steel Material | Thickness of Steel Material (mm) | Composition of Intermediate Layer | Thickness of Intermediate Layer (μm) |
|---|---|---|---|---|---|---|
| 16 | Pure W | 0.2 | SUS316L | 8 | Pure Ni | 10 |
| 17 | Pure W | 0.2 | SUS316L | 8 | Pure Ni | 15 |
| 18 | Pure W | 0.2 | SUS316L | 8 | Ni-54 Mass % Fe-17 Mass % Co | 15 |
| 19 | Pure W | 0.3 | SUS316L | 8 | Pure Ni | 50 |
| 20 | Pure W | 5.3 | SUS316L | 8 | Pure Ni | 30 |
| 21 | Pure W | 0.06 | SUS316L | 8 | Pure Ni | 40 |
| 22 | Pure W | 1.2 | SUS316L | 8 | Pure Ni | 10 |
| 23 | Pure W | 1.2 | SUS316L | 8 | Pure Ni | 10 |
| 24 | Pure W | 0.2 | SUS316L | 5 | BNi-2 (Brazing Material) | 50 |
| 25 | Pure W | 0.2 | SUS316L | 5 | BNi-5 (Brazing Material) | 50 |
| 26 | Pure W | 0.2 | SUS316L | 5 | BNi-7 (Brazing Material) | 50 |

(1-2) Joining Step

Regarding specimen No. 1, the fixed joining-target material was heated in a hydrogen atmosphere at 900° C. for 10 minutes, and was then compression-bonded in an argon atmosphere using a two-stage rolling machine. With the compression bonding, a tungsten/iron-based alloy clad material having a size of T of 4.5 mm×B of 100 mm×L of 180 mm was obtained. From the obtained clad material, one sample for cross section observation, one sample for evaluation on the density of the W layer, and one sample for evaluation on a degree of adhesion by X-ray CT were cut out to each have a size of B of 10 mm×L of 10 mm. Further, as samples for shearing test, five samples were cut out to each have a size of B of 10 mm×L of 1 mm.

An atmosphere for heating before the compression bonding is preferably a reducing atmosphere such as a hydrogen atmosphere or an inert atmosphere such as nitrogen or argon.

An atmosphere during the compression bonding can be an atmospheric air, a reducing atmosphere such as a hydrogen atmosphere, or an inert atmosphere such as nitrogen or argon; however, in view of prevention of oxidation, it is more preferable to perform the compression bonding under the inert atmosphere such as a nitrogen or argon atmosphere.

A compression bonding temperature is preferably more than or equal to 800° C. When the temperature is less than 800° C., the joining-target material might be insufficiently softened, with the result that joining might not be attained at the interface. The compression bonding temperature is more preferably more than or equal to 900° C. When the compression bonding temperature is more than or equal to 900° C., the joining-target material is sufficiently softened, with the result that joining is attained at the interface more readily.

The compression bonding temperature is preferably less than or equal to 1200° C. When the compression bonding temperature is more than 1200° C., the intermediate layer and the iron-based alloy might be melted and might be unable to be rolled. The compression bonding temperature is more preferably less than or equal to 1000° C. When the compression bonding temperature is more than 1000° C., a difference in ductility between the tungsten-containing layer and the iron-based metal becomes large during the compression bonding, with the result that it might become difficult to perform the compression bonding. When the compression bonding temperature is less than or equal to 1000° C., this difference becomes small, with the result that the compression bonding can be performed readily.

(1-3) Evaluation on Cross Section

The obtained sample was cut out, the cross section of the sample was formed into a mirror surface by performing rough polishing using water-resistant paper #500 and buffing using a diamond suspension, and then the cross section was observed using an electron beam microanalyzer (JXA-8200 provided by JEOL).

The composition and thickness of each layer were found by performing line scan in the thickness direction. The thickness of each layer was defined as the thickness of a region in which the total of the constituent element(s) of the layer was more than or equal to 50 mass % as a result of the line scan. In the tungsten-containing layer, the constituent element is tungsten. In the iron-based alloy layer, the constituent elements are iron, chromium, nickel, and molybdenum. In the intermediate layer, the constituent element is nickel. For each of specimens No. 2 to No. 23, the compositions of the tungsten-containing layer, the iron-based alloy layer, and the intermediate layer were analyzed in the same manner. As a result, the composition of each layer was the same as that of the starting material in Table 1.

In view of the above evaluation, it was confirmed that the thickness of the tungsten-containing layer was 0.2 mm and the thickness of the iron-based alloy was 4.3 mm. It was confirmed that the thickness of the intermediate layer was 7 μm and the intermediate layer was thinly distributed.

For each of specimens No. 2 to No. 23, the tungsten-containing layer, the iron-based alloy layer, and the intermediate layer were analyzed in the same manner. Results are shown in Table 3.

TABLE 3

| Table 3 Specimen No. | Joining Method | Joined Structure | Joining Temperature (° C.) | Thickness of Tungsten-Containing Layer (mm) | Relative Density of Tungsten-Containing Layer | Thickness of Iron-Based Alloy (mm) | Thickness of Intermediate Layer (μm) |
|---|---|---|---|---|---|---|---|
| 1 | Rolling and Compression Bonding | Tungsten-Containing Layer/ Intermediate Layer/Iron-Based Metal/ Intermediate Layer/Tungsten-Containing Layer | 900 | 0.2 | 0.999 | 4.3 | 7 |
| 2 | | | 900 | 0.2 | 0.999 | 4.4 | 7 |
| 3 | | | 900 | 0.2 | 0.999 | 4.3 | 7 |
| 4 | | | 900 | 0.2 | 0.999 | 4.3 | 8 |
| 5 | | | 900 | 1.0 | 0.999 | 4.4 | 8 |
| 6 | | | 900 | 0.7 | 0.999 | 30 | 9 |
| 7 | | | 900 | 0.7 | 0.999 | 1.0 | 8 |
| 8 | | | 900 | 0.05 | 0.999 | 4.3 | 7 |
| 9 | | | 900 | 0.05 | 0.999 | 30 | 7 |
| 10 | | | 900 | 0.08 | 0.999 | 1 | 15 |
| 11 | | | 900 | 0.2 | 0.999 | 2 | 8 |
| 12 | | | 900 | 0.7 | 0.999 | 2 | 7 |
| 13 | | | 900 | 0.7 | 0.999 | 2 | 7 |
| 14 | | | 900 | 0.7 | 0.999 | 2 | 8 |
| 15 | | | 1000 | 0.15 | 0.999 | 4.3 | 8 |
| 16 | | | 1100 | 0.15 | 0.999 | 4.3 | 8 |
| 17 | | | 800 | 0.15 | 0.999 | 4.4 | 12 |
| 18 | | | 900 | 0.15 | 0.999 | 4.4 | 13 |
| 19 | | | 900 | 0.2 | 0.998 | 4.4 | 42 |
| 20 | | | 900 | 5.0 | 0.999 | 4.4 | 21 |
| 21 | | Tungsten-Containing Layer/ Intermediate Layer/Iron-Based Metal | 900 | 0.05 | 0.999 | 4.4 | 32 |
| 22 | | Tungsten-Containing Layer/ Intermediate Layer/Iron-Based Metal/ Intermediate Layer/Tungsten-Containing Layer | 900 | 1.0 | 0.97 | 4.0 | 7 |
| 23 | | | 900 | 1.0 | 0.97 | 4.2 | 8 |
| 24 | Brazing | Tungsten-Containing Layer/ Intermediate Layer/Iron-Based Metal | 1050 | 0.2 | 0.999 | 5 | 57 |
| 25 | | | 1150 | 0.2 | 0.999 | 5 | 61 |
| 26 | | | 1000 | 0.2 | 0.999 | 5 | 54 |

(2) Preparation of Sample of Comparative Example 1 and Evaluation on Thickness of Intermediate Layer As a comparative example, a tungsten/iron-based alloy joined product was produced by brazing in a specimen No. 24, and a cross section evaluation was performed in the same manner using an electron beam microanalyzer.

The brazing was performed by brazing a rolled tungsten material having a size of T of 0.2 mm×B of 100 mm×L of 100 mm and a stainless steel (SUS316L) plate material having a size of T of 5 mm×B of 100 mm×L of 100 mm using a commercially available Ni-based brazing material, i.e., BNi-2 (7 mass % of chromium, 3 mass % of boron, 4.5 mass % of silicon, 3 mass % of iron, 0.05 mass % of carbon, and a remainder of nickel). Source materials thereof are shown in Table 2.

The surface of each of the rolled tungsten material and the SUS316L plate was polished using water-resistant paper #80, and then the rolled tungsten material, the BNi-2, and the SUS316L plate were layered in this order. The joining step is performed in the following manner: the rolled tungsten material, the BNi-2, and the SUS316L plate layered on one another were heated in vacuum under application of a load of 9.8 N from above and were held at 1050° C. sufficiently higher than the liquid phase appearance temperature of the brazing material, and then the furnace was cooled.

The joined sample was cut out, the cross section of the joined sample was formed into a mirror surface by performing rough polishing using water-resistant paper #500 and buffing using a diamond suspension, and then the cross section was evaluated in the same manner as in specimen No. 1 using an electron beam microanalyzer (JXA-8200 provided by JEOL).

As a result, the thickness of the tungsten-containing layer was 0.2 mm, and the thickness of the iron-based metal layer was 5 mm. A brazing material component was observed to be diffused from the intermediate layer into a joining-target material, and the intermediate layer was distributed thickly and had a thickness of 57 μm. In view of this, it was recognized that in each of the examples of the present disclosure, a joined material having an intermediate layer thinner and more uniform than that of the conventional art can be obtained.

As comparative examples, specimens No. 25 and No. 26 were processed in the same manner. Results are shown in Table 2. The composition of BNi-5 is as follows: 19 mass % of chromium, 10 mass % of silicon, and a remainder of nickel. The composition of BNi-7 is as follows: 13 mass % of chromium, 10 mass % of phosphorus, and a remainder of nickel. Specimen No. 26 represents an example in which the brazing was performed in the same manner as in specimen No. 25 in the production with the type of brazing material being changed.

(3) Evaluation on Density of Tungsten-Containing Layer

The iron-based metal layer of each of the obtained samples of specimens No. 1 to No. 26 was removed by its thickness by polishing using a plain grinder, and then electrolytic polishing was performed to remove the intermediate layer, thereby taking out only the tungsten-containing layer. Based on JIS Z 8807 (2012), the density of the taken-out tungsten-containing layer was measured in accordance with the hydrostatic weighing method.

In the measurement, the mass of the tungsten-containing layer in air and the mass of the tungsten-containing layer in water were measured to find the density of the tungsten-containing layer based on the measured masses. A value obtained by dividing the measured density by the theoretical density of the tungsten-containing layer was defined as the relative density of the tungsten-containing layer.

As a result of the measurement, it was confirmed that the relative density was 99.9% and the tungsten-containing layer was sufficiently dense in specimen No. 1. Also, it was confirmed that the relative density was more than or equal to 97% in each of the samples of specimens No. 2 to No. 26.

(4) Evaluation on Degree of Adhesion

Regarding specimen No. 1, a degree of adhesion in the obtained sample was evaluated by X-ray CT. The evaluation was made using a micro-focus X-ray CT apparatus (inspeXio SMX-225CT FPD HR provided by Shimadzu Corporation). Image capturing was performed under conditions that a tube voltage was set at 200 kV, a working distance was set at 10 mm, and a resolution was set at 10 μm. The number of voids each having a diameter of more than or equal to 10 μm just below tungsten was counted from the data obtained by capturing the image of the sample, so as to find the number of voids per cm². Results are shown in Table 4.

TABLE 4

| Table 4 Specimen No. | Joining Attained or Not | Number of Voids per cm² | Shearing Stress (MPa) | Position of Fracture |
|---|---|---|---|---|
| 1 | Attained | 0 | 271.3 | Base Material Fracture |
| 2 | Attained | 0 | 265.2 | |
| 3 | Attained | 0 | 276.3 | |
| 4 | Attained | 0 | 245.1 | |
| 5 | Attained | 0 | 253.6 | |
| 6 | Attained | 0 | 236.3 | |
| 7 | Attained | 0 | 262.3 | |
| 8 | Attained | 0 | 259.2 | |
| 9 | Attained | 0 | 252.1 | |
| 10 | Attained | 0 | 246.1 | |
| 11 | Attained | 0 | 285.4 | |
| 12 | Attained | 0 | 276.3 | |
| 13 | Attained | 0 | 241.1 | |
| 14 | Attained | 0 | 276.3 | |
| 15 | Attained | 0 | 277.3 | |
| 16 | Attained | 0 | 244.1 | |
| 17 | Attained | 2 | 251.2 | |
| 18 | Attained | 2 | 235.1 | |
| 19 | Attained | 1 | 202.3 | |
| 20 | Attained | 1 | 246.3 | |
| 21 | Attained | 0 | 223.2 | |
| 22 | Attained | 0 | 245.2 | |
| 23 | Attained | 0 | 246.3 | |
| 24 | Attained | 26 | 129.3 | Interface Fracture |
| 25 | Attained | 15 | 136 | |
| 26 | Attained | 21 | 132.1 | |

In view of the above evaluation, no voids of more than or equal to 10 μm were detected, so that the number of voids per cm² was 0.

In specimen No. 24, evaluation was made in the same manner as in specimen No. 1. The sample was captured in image under conditions that micro-focus X-ray CT apparatus (inspeXio SMX-225CT FPD HR provided by Shimadzu Corporation) was used, a tube voltage was set at 200 kV, a working distance was set at 10 mm, and a resolution was set at 10 μm.

In the sample in which artificial defects each having φ of 0.1 mm was introduced in advance, it was confirmed that a defect portion appeared in a black color and a non-defect portion appeared in a white color in the X-ray CT image. Therefore, a black portion in the X-ray CT image was regarded as the defect portion. In the image obtained by the measurement, image analysis software (Image-Pro Plus) was used to calculate the number of voids per cm² by counting the number of voids each having a diameter of more than or equal to 10 μm just below tungsten.

It should be noted that the diameter of the defect was defined as a value obtained by finding the area of the defect portion from the image and converting the area to the diameter of the circle assuming that the shape of the defect is a circle. As a result of the series of measurements, the number of voids per cm² was 26. In view of this, it was recognized that the number of voids in the present disclosure is smaller than that in the conventional art to attain joining with a high degree of adhesion. In each of the other specimens, the number of voids was checked in the same manner. Results are shown in Table 4.

(5) Evaluation on Joining Strength

Figure 2:
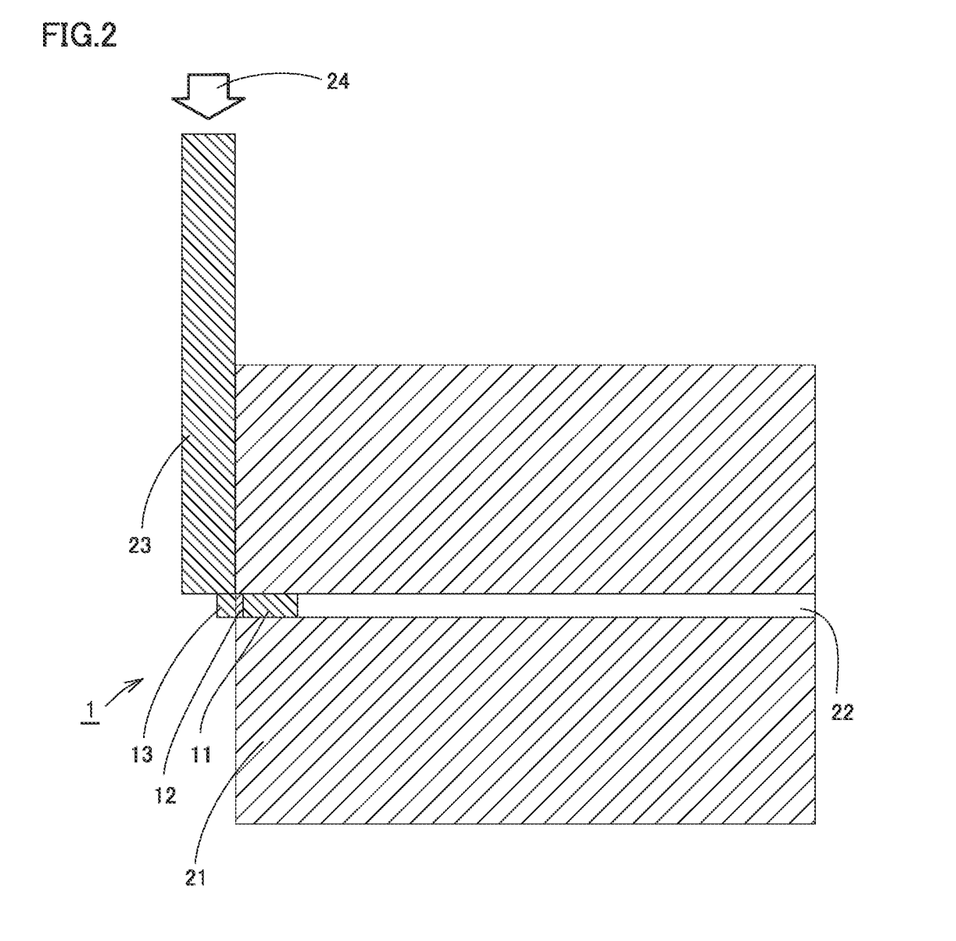
FIG. 2 is a cross sectional view of a jig and the composite material fixed to the jig to illustrate a method of evaluating joining strength.

Joining strength of each of the samples was evaluated by a shearing strength test. FIG. 2 is a cross sectional view of a jig and the composite material fixed to the jig to illustrate a method of evaluating joining strength.

Each of specimens No. 1 to No. 26 in Table 3 was cut into a size of B of 10 mm×L of 1 mm so as to produce a test piece of composite material 1 for shearing test. The test piece was set in a recess 22 of a jig 21 so as to protrude from jig 21 by the thickness of tungsten-containing layer 13 on the surface thereof.

An indenter 23 was placed on tungsten-containing layer 13, and a universal tester (model 5985 provided by Instron) was used to apply a load in a compression direction indicated by an arrow 24 until the test piece was fractured. A position of fracture in the test piece is shown in Table 4.

When the fracture is "base material fracture", it is indicated that breakage has occurred in tungsten-containing layer 13 serving as the base material. It was recognized that the joining strength was comparable to or more than or equal to the strength of the tungsten-containing layer 13 serving as the base material.

As a result of making evaluation in the same manner on each of the samples of specimens No. 24 to No. 26 of the comparative examples produced by brazing, fracture occurred at the joining interface just below tungsten. Thus, it is understood that in each of specimens No. 24 to No. 26, the joining interface formed by intermediate layer 12 is likely to be broken and the joining strength is insufficient.

Figure 3:
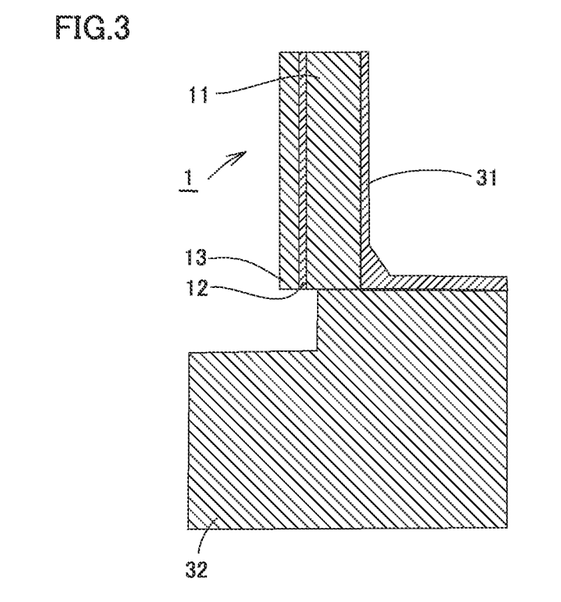
FIG. 3 is a cross sectional view of a fixing table and the composite material fixed to the fixing table to illustrate a method of evaluating heat resistance.

FIG. 3 is a cross sectional view of a fixing table and the composite material fixed to the fixing table to illustrate a method of evaluating heat resistance. In order to evaluate the heat resistance, as shown in FIG. 3, composite material 1 was fixed on a fixing table 32 using a fixing jig 31. When the composite material was heated in a nitrogen furnace at 1200° C. for 15 minutes, displacement resulting from melting of the intermediate layer was observed and the original shape thereof was not maintained in each of the products of specimens No. 24 to No. 26, whereas the heat resistance was high at a temperature of 1200° C. in each of specimens No. 1 to No. 23.

A conventionally used iron-based alloy (iron, steel, stainless steel, or the like) may be unsuitable for a structural material of a device required to have a radiation shielding property, a mechanical property at high temperature, hydrogen embrittlement resistance, and the like. Tungsten, which has a high density, a high melting point, and a property for avoiding hydrogen embrittlement, can be suitable for such a structural material.

However, since it is difficult to process tungsten, it is difficult to solely apply tungsten to the structural material, particularly, since tungsten is inferior to the iron-based alloy in terms of weldability required for construction of the structural material, it is difficult to solely apply tungsten to the structural material. For this reason, in some cases, tungsten and the iron-based alloy are combined with each other by brazing for the sake of use. However, when tungsten and the iron-based alloy are combined by the conventional art such as brazing, the heat resistance of tungsten cannot be fully utilized due to presence of the joining layer having a melting point much lower than that of tungsten or the iron-based alloy, disadvantageously. Further, voids or a brittle reaction layer remains in the joining layer, thus resulting in low mechanical property, particularly, low strength, disadvantageously. In some examples, they are combined by providing a copper alloy, such as a copper chromium alloy or a copper beryllium alloy, as the joining layer between tungsten and the iron-based alloy, the copper alloy having lower strength than that of each of tungsten and the iron-based alloy. However, the melting point of each of these copper alloys is much lower than that of the iron-based alloy, thus arising a problem in terms of heat resistance and strength of the joining layer.

In order to solve these problems, the composite material of the present disclosure attains heat resistance and high strength by using the intermediate layer having heat resistance and a small number of joining defects when combining an industrially widely used iron-based alloy having high strength and tungsten having high density, high melting point and a property for avoiding hydrogen embrittlement.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: composite material; 11: iron-based alloy layer; 12: intermediate layer; 13: tungsten-containing layer; 21: jig; 22: recess; 23: indenter; 31: fixing jig; 32: fixing table.

The invention claimed is:

1. A composite material comprising:
an iron-based alloy layer;
an intermediate layer provided on the iron-based alloy layer; and
a tungsten-containing layer provided directly on the intermediate layer, wherein
a thickness of the tungsten-containing layer is more than or equal to 0.05 mm and less than 5 mm,
a relative density of the tungsten-containing layer is more than or equal to 97%,
the intermediate layer is composed of pure nickel,
a content ratio of tungsten of the tungsten-containing layer is more than or equal to 70 mass %,
a thickness of the intermediate layer is less than or equal to 50 μm; and
a number of voids each having a diameter of more than or equal to 10 μm is less than or equal to 10 per cm² between the iron-based alloy layer and the tungsten-containing layer.

2. The composite material according claim 1, wherein the iron-based alloy layer has a plate shape.

3. The composite material according claim 1, wherein the intermediate layer has a plate shape.

4. The composite material according claim 1, wherein the tungsten-containing layer has a plate shape.

5. A composite material comprising:

an iron-based alloy layer;

an intermediate layer provided on the iron-based alloy layer; and a tungsten-containing layer provided directly on the intermediate layer, wherein a thickness of the tungsten-containing layer is more than or equal to 0.05 mm and less than 5 mm, a relative density of the tungsten-containing layer is more than or equal to 97%, the intermediate layer is composed of an alloy that contains at least one selected from a group consisting of copper, cobalt, and iron at more than 0 mass % and less than or equal to 71 mass % in total, and that contains nickel at more than or equal to 29 mass % and less than 100 mass %, a content ratio of tungsten of the tungsten-containing layer is more than or equal to 70 mass %, a thickness of the intermediate layer is less than or equal to 50 μm; and a number of voids each having a diameter of more than or equal to 10 μm is less than or equal to 10 per $cm^2$ between the iron-based alloy layer and the tungsten-containing layer.

6. The composite material according claim 5, wherein the iron-based alloy layer has a plate shape.

7. The composite material according claim 5, wherein the intermediate layer has a plate shape.

8. The composite material according claim 5, wherein the tungsten-containing layer has a plate shape.

9. The composite material according claim 1, wherein the thickness of the tungsten-containing layer is more than or equal to 0.05 mm and less than or equal to 4 mm.

10. The composite material according claim 1, wherein the thickness of the tungsten-containing layer is more than or equal to 0.08 mm and less than or equal to 1 mm.

11. The composite material according claim 5, wherein the thickness of the tungsten-containing layer is more than or equal to 0.05 mm and less than or equal to 4 mm.

12. The composite material according claim 5, wherein the thickness of the tungsten-containing layer is more than or equal to 0.08 mm and less than or equal to 1 mm.

* * * * *